United States Patent [19]
Shaw et al.

[11] Patent Number: 5,960,168
[45] Date of Patent: Sep. 28, 1999

[54] DEFERRED PRINTING

[75] Inventors: Lin F. Shaw; Chia-Chi Teng; Kenneth W. Sykes; Raymond E. Endres, all of Redmond, Wash.

[73] Assignee: Microsoft Corporation, Redmond, Wash.

[21] Appl. No.: 09/205,629

[22] Filed: Dec. 3, 1998

Related U.S. Application Data

[63] Continuation of application No. 08/960,722, Oct. 29, 1997, Pat. No. 5,881,213, which is a continuation of application No. 08/643,884, May 7, 1996, abandoned, which is a continuation of application No. 08/318,079, Oct. 5, 1994, abandoned.

[51] Int. Cl.$^6$ ...................................................... G06F 15/00
[52] U.S. Cl. ........................................... 395/114; 395/113
[58] Field of Search ..................................... 395/114, 115, 395/117, 101, 102, 103, 104, 105, 106, 107, 108, 109, 110, 111, 112, 113, 116; 345/326, 346, 356

[56] References Cited

U.S. PATENT DOCUMENTS

| | | | |
|---|---|---|---|
| 4,698,688 | 10/1987 | Ochi et al. ............................... | 358/257 |
| 4,829,468 | 5/1989 | Nonaka et al. .......................... | 364/900 |
| 5,081,579 | 1/1992 | Komai et al. ............................ | 364/405 |
| 5,228,118 | 7/1993 | Sasaki ...................................... | 395/112 |
| 5,268,993 | 12/1993 | Ikenoue et al. .......................... | 395/114 |
| 5,287,194 | 2/1994 | Lobiondo ................................ | 358/296 |
| 5,287,434 | 2/1994 | Bain et al. ............................... | 395/101 |
| 5,299,296 | 3/1994 | Padalino et al. ........................ | 395/112 |
| 5,303,336 | 4/1994 | Kageyama et al. ..................... | 395/114 |
| 5,502,839 | 3/1996 | Kolnick .................................... | 395/800 |
| 5,566,278 | 10/1996 | Patel et al. ............................... | 395/114 |
| 5,579,087 | 11/1996 | Salgado ................................... | 355/202 |
| 5,604,599 | 2/1997 | Ono .......................................... | 358/296 |
| 5,604,843 | 2/1997 | Shaw et al. .............................. | 395/101 |
| 5,625,757 | 4/1997 | Kageyama et al. ..................... | 395/113 |
| 5,644,682 | 7/1997 | Weinberger et al. .................... | 395/101 |
| 5,689,642 | 11/1997 | Harkins et al. ..................... | 395/200.04 |
| 5,732,198 | 3/1998 | Deppa et al. ............................ | 395/114 |
| 5,740,028 | 4/1998 | Sugiyama et al. ...................... | 364/130 |
| 5,847,729 | 12/1998 | Takehashi et al. ........................ | 347/43 |
| 5,859,956 | 1/1999 | Sugiyama et al. ...................... | 395/112 |
| 5,881,213 | 3/1999 | Shaw et al. .............................. | 395/114 |

OTHER PUBLICATIONS

Simpson, *Mastering WordPerfect ®5.1 & 5.2 for Windows*™, Sybex, Inc. Alameda, Ca., Chapter 8, 1993.

*Primary Examiner*—Steven P. Sax
*Attorney, Agent, or Firm*—Seed and Berry LLP

[57] ABSTRACT

Facilities are provided within an operating system for supporting deferred printing of print jobs. The process of spooling a print job and the process of despooling the print job are decoupled, such that a printer need not be available at the time of spooling. Print jobs are spooled in a device-independent format, such as the enhanced metafile format. The print jobs may be spooled without a printer driver being installed for a target printer or without the target printer being connected to the system. Later, when the target printer becomes available, the print job is despooled and printed. A configuration database holds different printer configurations that list available printers in different environments. For example, a user may have a different configuration for printers available when he uses his computer at home, at work and on the road, respectively. The configurations help the user to identify the printers that are currently available and those that are available in other settings. When a currently active machine configuration changes, the system checks for spooled jobs on printers that were previously unavailable and are now available and asks the user if the user wishes to start printing these spooled print jobs.

11 Claims, 8 Drawing Sheets

DEFERRED PRINTING

CROSS-REFERENCE TO RELATED APPLICATION

This application is a continuation of U.S. patent application Ser. No. 08/960,722, filed Oct. 29, 1997, allowed Sep. 25, 1998, which is a continuation of U.S. patent application Ser. No. 08/643,884, filed May 7, 1996, now abandoned, which is continuation of U.S. patent application Ser. No. 08/318,079, filed Oct. 5, 1994, now abandoned.

TECHNICAL FIELD

The present invention relates generally to computer systems and, more particularly, to providing deferred printing within computer systems.

BACKGROUND OF THE INVENTION

Many conventional operating systems support the spooling of print jobs. Spooling involves buffering data that is transferred from a processor to peripheral devices, such as printers, to reduce processing delays. The buffered data is stored on secondary storage devices, such as hard disks, in a format that is device-specific (e.g., specific to the printer). When spooling print jobs, if a printer is unknown, the print job cannot be spooled. Moreover, if a print driver for he target printer is not yet installed, the print job cannot be spooled. This poses an especially troublesome problem to users who operate in disconnected environments, such as mobile users that employ portable computers.

SUMMARY OF THE INVENTION

In accordance with a first aspect of the present invention, a method is practiced in a computer system having a processor that runs a program and a printer that executes print jobs. A printer driver for the printer is unavailable. In this method, a print job is initiated from the program to print on the printer. The print job is spooled in a device-independent format. The print job may be despooled so that it is executed when the printer driver for the printer becomes available.

In accordance with another aspect of the present invention, a method is practiced in a computer system that has a processor and at least one printer. The processor runs an application program and an operating system that includes facilities for spooling and despooling print jobs. In this method, a print job is initiated from the application program and spooled using the facilities of the operating system. The application program completes executing. The operating system monitors the status of the printer to determine whether the printer is available or not. In this context, a printer is available when a print driver for the printer is installed and the printer is connected to the computer system. When the operating system determines that the printer is available, the print job is despooled to execute the print job on the printer.

In accordance with a further aspect of the present invention, the system includes a portable computer and a network with at least one printer. While the portable computer is disconnected from the network, a print job to the printer of the network is initiated. The print job is spooled in a device-independent format. The portable computer is then reconnected to the network, and the print job is despooled to execute the print job on the printer.

In accordance with yet another aspect of the present invention, a method is practiced in a computer system having a storage, printers for executing print jobs, and a computer running an operating system. In this method, a configuration database is provided in the storage to hold machine configuration information. Multiple machine configurations are stored within the configuration database. Each machine configuration includes a list of available printers. The operating system determines which of the machine configurations is currently active. The printers in the list of available printers of the currently active machine configuration are denoted as currently available printers. A default printer is determined from the currently available printers and the user is made aware of the currently available printers.

In accordance with an additional aspect of the present invention, a computer system includes a printer for executing print jobs. The printer is unknown and has an associated printer driver that is unavailable. The computer system also includes a processor for running a program that has a means for initiating a print job. The processor runs an operating system that has a spooler for spooling the print job initiated by the application program in a device-independent fashion. The spooler produces a spool file that holds the spooled print job in the device-independent format.

In accordance with a further aspect of the present invention, a system includes a network, a portable computer, and at interface for connecting the portable computer with the network. The network includes at least one printer. The portable computer includes a processor running a program that initiates a print job and a spooler for spooling the print job, that was initiated by the program, in a device-independent format. The operating system also includes a despooler for despooling the print job to execute the print job on the printer when the portable computer is reconnected to the network.

DETAILED DESCRIPTION OF THE INVENTION

The preferred embodiment of the present invention decouples the process of spooling a print job from the process of despooling a print job. In the preferred embodiment of the present invention, a print job may be spooled in a device-independent fashion such that the printer to which it is destined need not be known at the time the print job is spooled. The print job is then later printed on the destination printer when the destination printer becomes known and its printer driver available. The preferred embodiment of the present invention also provides the user with multiple available machine configurations. Thus, a user may have a first machine configuration that includes the printers that are available when he is connected to a network and a second machine configuration that includes the printers that are available when he is disconnected to the network.

The different machine configurations are managed on a per docking state basis. Docking state, in this context, refers to whether the machine is docked to a docking station and if docked, to what docking station it is docked. Thus, a machine might have three machine configurations: a first for when it is disconnected (a first docking state), a second for when it is connected to a docking station (a second docking state), and a third when it is connected to another docking station (a third docking state).

It should also be noted that the deferred printing of the preferred embodiment of the present invention is spooled in a fashion such that the type of target printer need not be known and the printer driver for the target printer need not be available when a print command to print a document is issued.

Figure 1A:
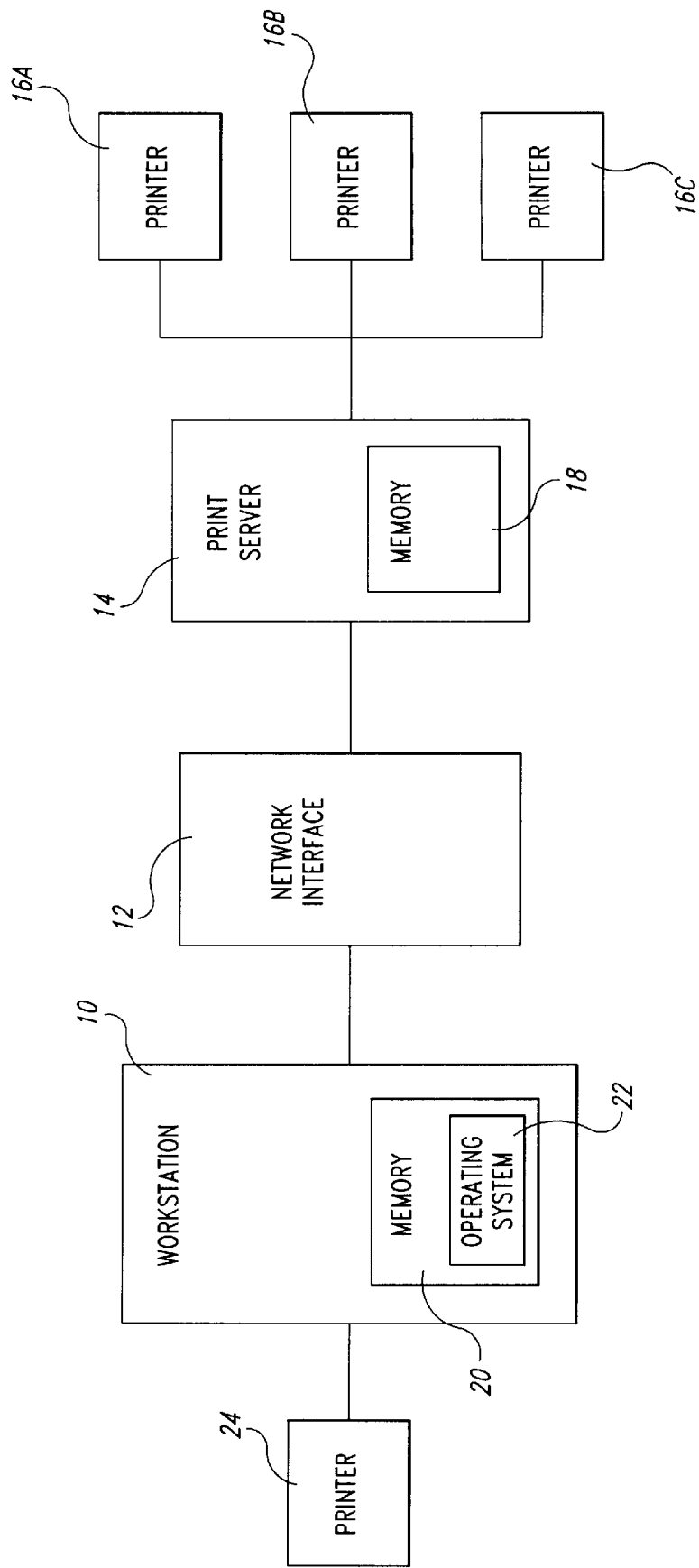
FIG. 1A is a block diagram illustrating a first machine configuration of a computer system that is suitable for practicing the preferred embodiment of the present invention.
Figure 1B:
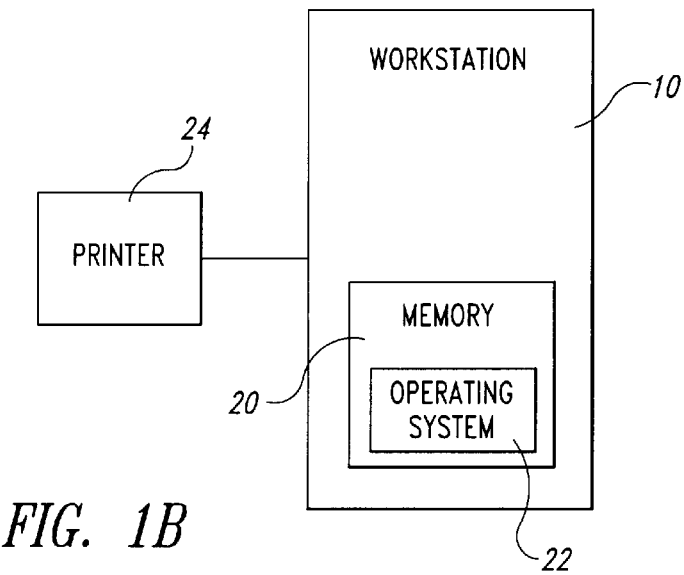
FIG. 1B is a block diagram illustrating a second machine configuration of a computer system that is suitable for practicing the preferred embodiment of the present invention.

FIGS. 1A and 1B show examples of machine configurations that are suitable for practicing the preferred embodiment of the present invention. In FIG. 1A, a workstation 10 is connected to a local area network via a network interface 12. The network includes a print server 14 that is responsible for controlling printers 16A, 16B and 16C. These printers 16A, 16B and 16C may be any of a number of different types of printers. The print server 14 includes its own memory 18.

The workstation 10 is also connected directly to an additional printer 24. The workstation 10 has a memory 20, in which it stores a copy of an operating system 22. The preferred embodiment of the present invention is implemented as part of the operating system 22. Nevertheless, those skilled in the art will appreciate that the present invention may also be practiced using code that is encapsulated into modules outside of an operating system.

As shown in FIG. 1B, the workstation 10 may be disconnected (i.e., not docked) from the network to operate independently. In such instances, the workstation 10 remains connected to and may use the local printer 24 but does not have direct access to printers 16A, 16B and 16C.

The preferred embodiment of the present invention allows a disconnected workstation 10, such as shown in FIG. 1B, to initiate print jobs that are directed to printers (such as printers 16A, 16B and 16C) that are not presently available for printing. This ability is achieved in part by using spooling to spool the print jobs until the target printer later becomes available. The print jobs are spooled in a device-independent fashion to avoid the need for a printer driver to be installed before a print job can be initiated. Moreover, this spooling avoids the extensive processing required to convert the print job into a device specific format while the initiating program waits.

Figure 2:
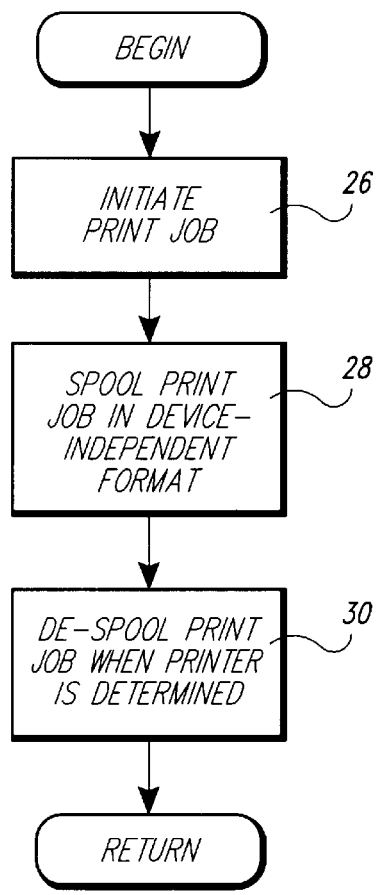
FIG. 2 is a flow chart providing an overview of the steps performed to print in accordance with the preferred embodiment of the present invention.

FIG. 2 is a flowchart that provides an overview of the steps performed in the preferred embodiment of the present invention. A print job is initiated by an application program or other program run on workstation 10 (step 26). The print job may be destined for a printer that is currently available or to a printer that is not currently available to the user, but is available in other machine configurations (configurations will be discussed below). Moreover, the print job may be initiated without specifying a printer so that it is sent to a default printer. As will be discussed below, each configuration has its own associated default printer.

Once the print job is initiated, the print job is spooled in a device-independent format (step 28 in FIG. 2). In the preferred embodiment of the present invention, this device-independent format is an enhanced metafile format. The conversion and spooling of the print job will be discussed in more detail below. Once the target printer to which the print job is destined becomes known and a printer driver for the printer is available, the print job may be despooled so as to print the print job on the target printer (step 30).

An example is helpful to illustrate the notion of machine configurations. Assume that a user wishes to print a document when disconnected from the network, such as shown in FIG. 1B. Further, suppose the user wishes to print to a printer, like printer 16B (FIG. 1A), that is in the network. In conventional systems, such a print job could not be initiated because printer 16B is not known. In the preferred embodiment of the present invention, on the other hand, the print job may be initiated even though printer 16B is unavailable. When the workstation 10 later becomes reconnected to the network (such as shown in FIG. 1A), printer 16B becomes available again and the print job is despooled and executed on printer 16B.

Figure 3:
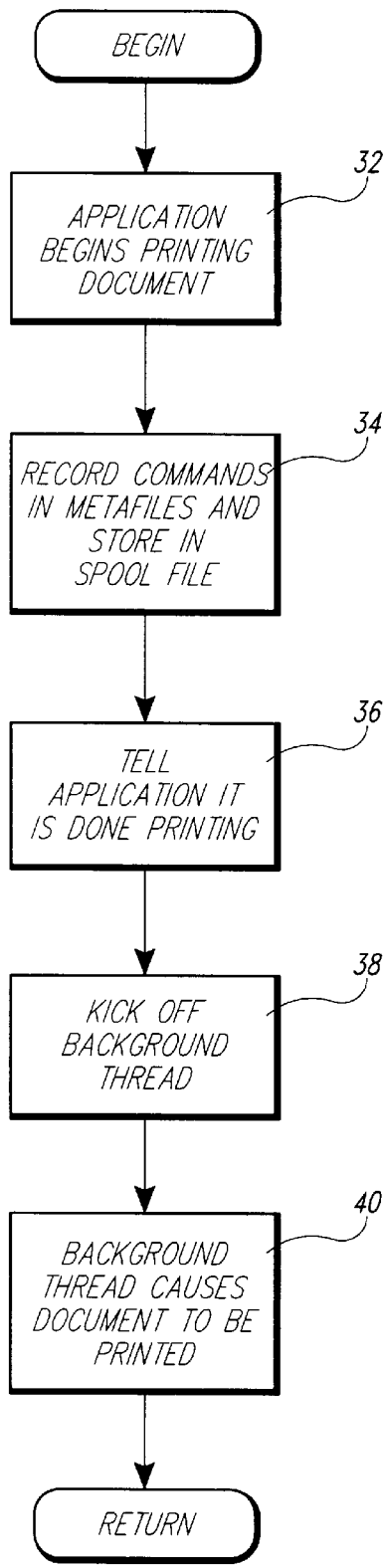
FIG. 3 is a flow chart illustrating the steps performed to print a document when spooled in the enhanced metafile format in accordance with the preferred embodiment of the present invention.

FIG. 3 is a flowchart showing the steps that are performed to print a document when enhanced metafile spooling is used. Initially, the application begins printing the document by issuing printing commands to a graphical device interface (GDI) of the operating system 22 (step 32). The GDI serves as an interface between application programs and lower level device drivers. Calls from a program to GDI functions to print are recorded as enhanced metafile records and stored in a spool file within memory 20 of the workstation 10 when the Workstation is disconnected from the network (step 34). When all of the calls to the graphical device interface have been converted into enhanced metafile format and stored in a spool file, the application program that initiated the printing request is informed that it is done printing (step 36). The application program continues as if the printing request has been completed. The printing is completed asynchronously relative to the application program. Hence, the application program may be done executing when the print job is executed.

When the workstation 10 reconnects to the network via the network interface 12, the workstation 10 initiates a background thread associated with the port for printer 16B to print the spooled print job (step 38). The spooled print job is in the print queue for the workstation. The spooled print job is despooled and converted from enhanced metafile format into a format that is particular to printer 16B and printed on printer 16B (step 40).

Figure 4:
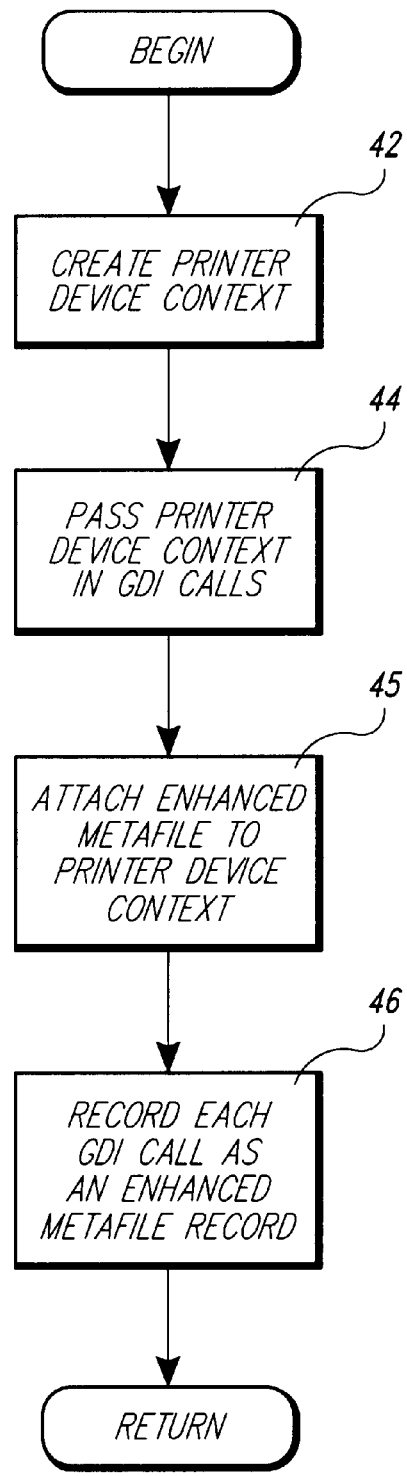
FIG. 4 is a flow chart illustrating the steps that are performed to create an enhanced metafile version of a print job in the preferred embodiment of the present invention.

FIG. 4 is a flowchart that illustrates in more detail the steps that are performed to convert the calls to GDI functions from the application program into enhanced metafile records (see step 34 in FIG. 3). Initially, a device context for a printer is created (step 42). A device context is a data structure that holds attributes associated with a target device. These attributes are used by the GDI functions to properly execute the functions on the target devices. In addition, in order to maintain transparency of the spooling in the enhanced metafile format, settings regarding the currently visible region that are controlled by the window manager are set so that no output is produced by the corresponding GDI function call.

Once the printer device context has been created in step 42, a handle to this device context is available. The handle is a numerical identifier that uniquely identifies the printer's device context. This handle to the printer device context is passed as the parameter for each of the calls from the application program to the GDI (step 44 in FIG. 4). When the application issues the command to start printing the first page of a document, GDI attaches an enhanced metafile to the printer device context (step 45). This process of attaching an enhanced metafile to the printer device context makes the printer device context look like a metafile device context. Then each call to a GDI function that includes the printer device context as a parameter is converted into an enhanced metafile record in the enhanced metafile associated with this printer device context.

Figure 5:
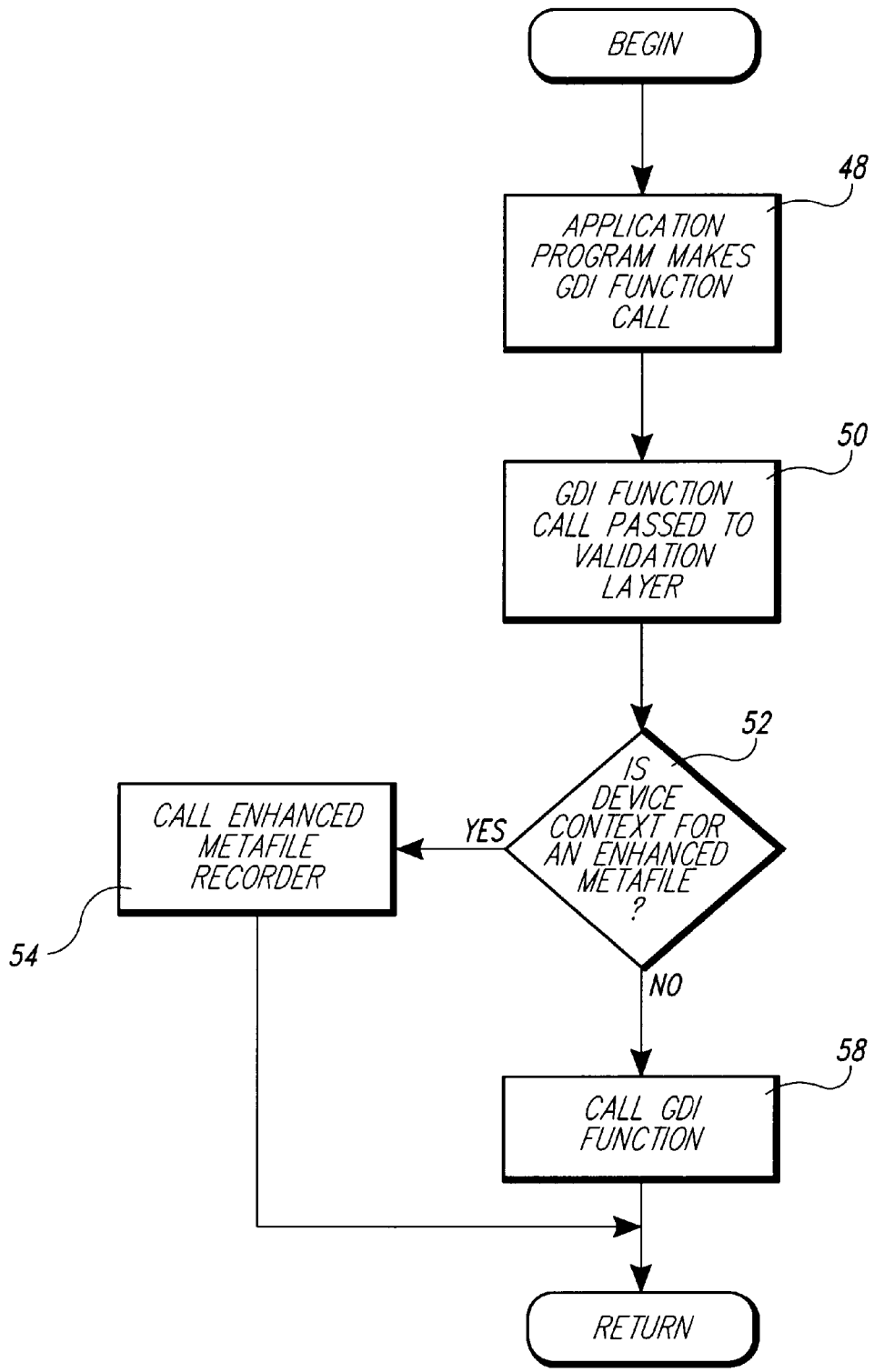
FIG. 5 is a flow chart illustrating the steps that are performed to determine whether to record a function call in an enhanced metafile in accordance with the preferred embodiment of the present invention.

FIG. 5 is a flowchart showing in more detail how the calls to the GDI functions are converted into enhanced metafile records in step 46 of FIG. 4. The process begins when an application program makes a GDI function call that includes the printer device context as a parameter (step 48). The GDI function call is then passed to a validation layer within the operating system 22 (step 50). The validation layer is the portion of the operating system 22 that is responsible for validating that the parameters to the GDI function calls are proper (step 50). The validation layer checks whether the device context that is passed as a parameter to the GDI function call looks like a device context for an enhanced metafile (see step 52). If the device context appears to be for an enhanced metafile, an enhanced metafile recorder is called (step 54). The enhanced metafile recorder is part of the operating system 22 and is like enhanced metafile recorders found in the MICROSOFT WINDOWS™ NT Operating System, sold by Microsoft Corporation of Redmond, Wash. Each GDI function is then called to insure that the application program believes that it has printed the associated document (step 58). If in step 52 it is determined that the device context is not for an enhanced metafile, the GDI function is called directly (step 58).

Another aspect of allowing the user to print to printers that are not currently available is to provide a user with information that illustrates printers that are available in alternative machine configurations, but are not currently available for printing to the user. The preferred embodiment of the present invention may store separate multiple machine configurations for each workstation 10, if desired. In fact, these configurations are stored on a per-docking state (i.e., a separate machine configuration is maintained for when the computer is not docked and for each docking station to which the machine may dock), per-user basis so that users that share a single machine may have their own set of machine configurations. Each machine configuration includes a subset of the printers that are potentially available to a user of the Workstation 10. For example, separate machine configurations may be provided to capture the available printers for the two different scenarios depicted in FIGS. 1A and 1B. In the scenario depicted in FIG. 1A, the associated machine configuration has a list of available printers that includes printers 16A, 16B, 16C and 24. For the scenario depicted in FIG. 1B, however, the associated machine configuration includes printer 24 as an available printer.

The operating system 22 provides a centralized database, known as the registry 60 (FIG. 6) for storing all configuration information. The configuration information that is held on a per docking state per user basis includes a list of available printers for the user for the associated machine configuration. Thus, for the examples depicted in FIG. 1A and FIG. 1B, a first machine configuration 64 and a second machine configuration 66 are stored within the registry 60.

Figures 6, 7:
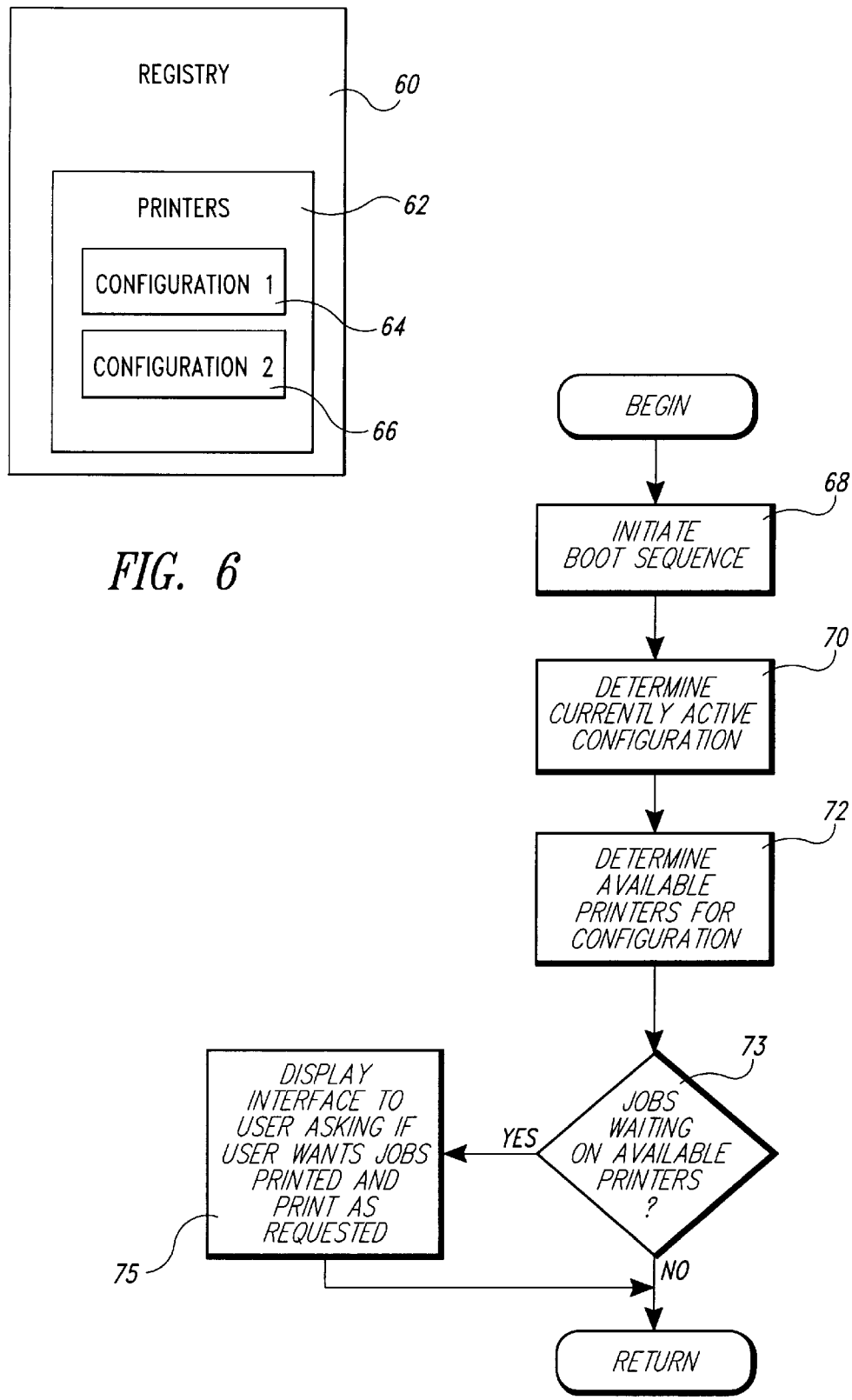
FIG. 6 is a block diagram illustrating a registry with illustrative contents as used in the preferred embodiment of the present invention.
FIG. 7 is a flow chart illustrating the steps that are performed to utilize the registry of FIG. 6.

Each user of a workstation 10 has an associated current machine configuration. FIG. 7 is a flowchart showing the steps that are performed to select the appropriate current machine configuration when the workstation 10 is booted. First, the boot sequence for the workstation 10 is initiated (step 68). As part of this boot sequence, the workstation 10 learns the correct machine configuration (step 70). Based upon the currently active configuration, a list of available printers is determined by accessing the configuration information in the registry 60 (step 72). For example, suppose that the boot sequence determines that the machine configuration for disconnected operation is the current machine configuration. In step 72, it is determined that only printer 24 is available. The system then checks whether any jobs have been spooled for printers that are currently available but previously have not been available (step 73). If so, a user interface is displayed that asks the user whether the user wishes to print any of the spooled print jobs. If the user wishes to print such spooled print jobs, they are printed (step 75).

Figure 8:
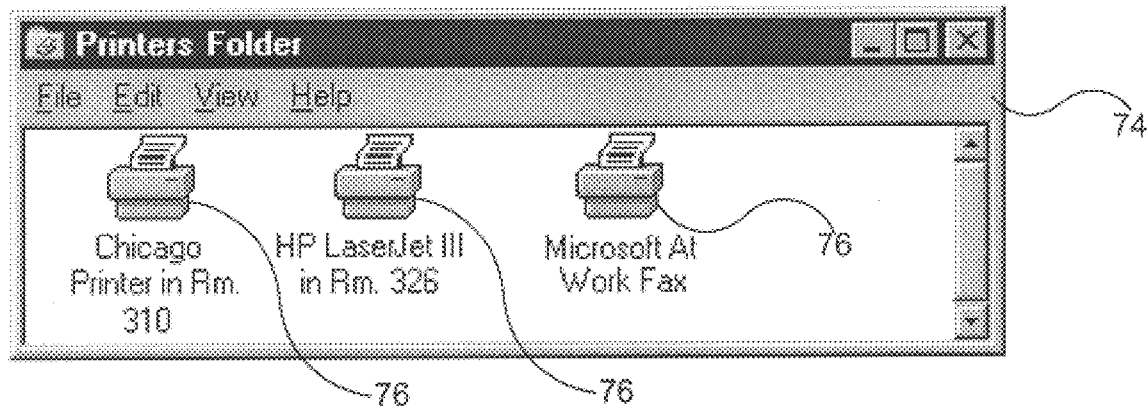
FIG. 8 is a block diagram depicting an open Printers window in accordance with the preferred embodiment of the present invention.
Figure 9:
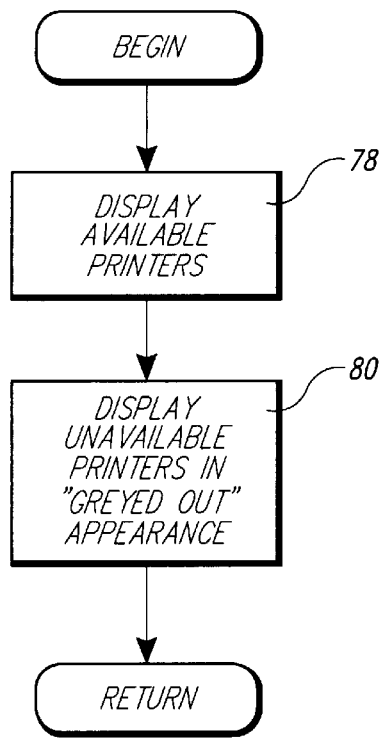
FIG. 9 is a flow chart illustrating the steps that are performed to apprise a user of a current machine configuration in accordance with the preferred embodiment of the present invention.

As was discussed above, the printers for all of the machine configurations are accessible to a user of the workstation 10. The machine configurations are stored within a folder 74 (FIG. 8) that is accessible to the user. FIG. 9 is a flowchart illustrating the steps that are performed to display printers in a currently active machine configuration to the user. The printers of the current machine configuration are displayed in conventional fashion, such as icons 76 in FIG. 8 when the machine configuration folder is opened (step 78). The unavailable printers (i.e., the printers in the other machine configurations that are not available) are displayed in a distinguishing fashion to differentiate them from the printers that are available (step 80). For instance, in the preferred embodiment of the present invention, the icons for the unavailable printers are displayed with a "greyed out" appearance (not shown in FIG. 8).

Figure 10:
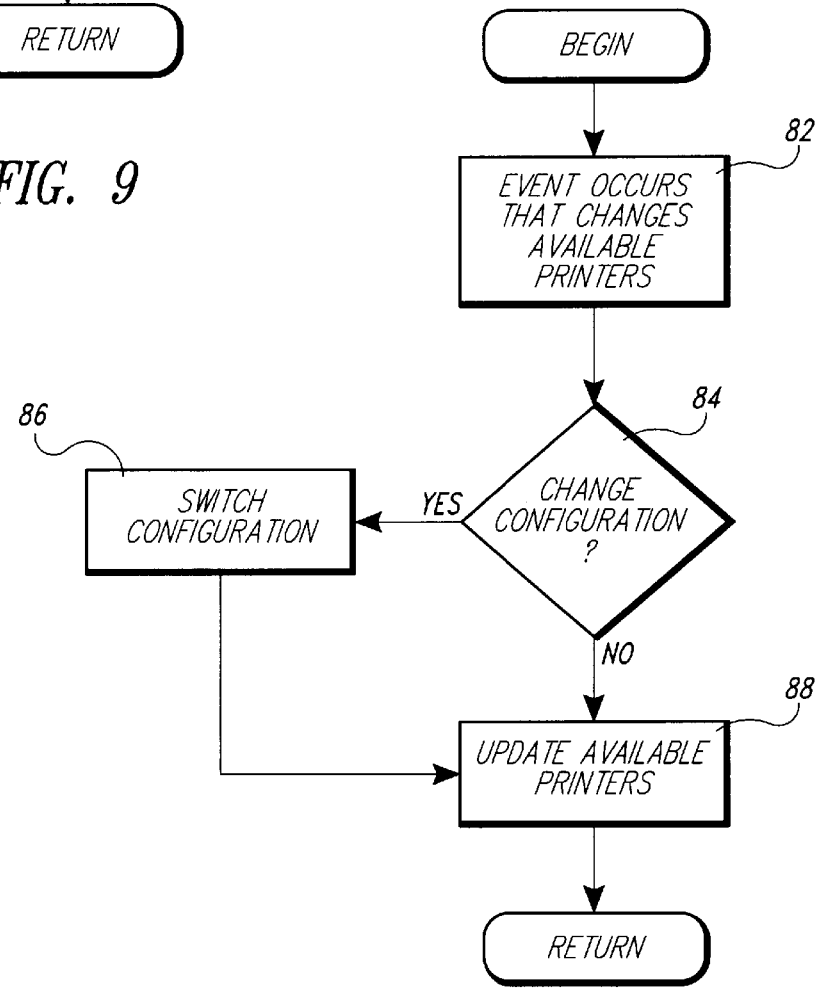
FIG. 10 is a flow chart illustrating the steps that are performed to change a machine configuration in response to events in the preferred embodiment of the present invention.

It should be appreciated that the machine configurations are not static; rather, the machine configurations are dynamic. FIG. 10 is a flowchart illustrating how configurations may change due to events within the system. Initially, an event occurs that changes the printers that are available (step 82). The system determines that this is the type of event that requires a changing of the current machine configuration or that merely requires modification of the current machine configuration (step 84). For example, if the workstation 10 is disconnected from the network, disconnection is the type of event that triggers a change of machine configuration. Thus, the machine configurations are switched (step 86). On the other hand, if the event is the type that does not require the switching of machine configurations, but rather requires a change in the current machine configuration, the available printers of the current machine configuration is updated to reflect the change prompted by the event (step 88). For example, suppose that printer 24 becomes disconnected from workstation 10 while the workstation is disconnected from the network. Such an event would not change the current machine configuration, but would merely require that printer 24 be shown as unavailable. Printers may be added or deleted from a machine configuration. In addition, a user may change the name of a printer in a machine configuration. All of these actions are events that require processing as shown in FIG. 10.

Each machine configuration has a default printer. If no printer is specified or available, the default printer is assigned as the target printer. Different machine configurations may have different default printers.

While the present invention has been described with reference to a preferred embodiment thereof, those skilled in the art will appreciate that various changes in form and detail may be made without departing from the intended scope of the present invention as defined in the appended claims.

We claim:

1. A method in a computer system for deferring the printing of a print job directed to an unavailable printer, the method comprising the steps of:

under the control of a program, issuing printing commands to the operating system identifying a printer by calling a printing interface of the operating system to invoke a device driver to print the print job, the printing commands being issued by the program to print a print job immediately on the identified printer;

under the control of the operating system:
receiving the issued printing commands;
determining that the identified printer is presently unavailable;
in response to determining that the identified printer is presently unavailable:
persistently storing information from the printing commands, such that the stored information may be used to invoke the device driver to print the print job on the identified printer at a later time; and
though the print job was not actually printed, returning to the program an indication that the issued printing commands were successfully completed and the print job was printed.

2. The method of claim 1 wherein the determining step determines that the printer driver is not presently accessible by the computer system.

3. The method of claim 1 wherein the determining step determines that the identified printer is not presently connected to the computer system.

4. The method of claim 1 wherein the determining step determines that the computer system is not presently authorized to print to the identified printer.

5. The method of claim 1, further comprising the steps of:

at a time after the performance of the returning step, determining that the identified printer is available;
in response to the step of determining that the identified printer is available, retrieving the information stored persistently; and
using the retrieved information to print the print job on the identified printer.

6. The method of claim 5, further comprising the step of monitoring for the availability of the identified printer, and wherein the performance of the determining step is based upon the monitoring step.

7. The method of claim 1 wherein the printing interface of the operating system is a graphic device interface.

8. A computer-readable medium whose contents cause a computer system to defer the printing of a print job directed to an unavailable printer by performing the steps of:

under the control of a program, issuing printing commands to the operating system identifying a printer by calling a printing interface of the operating system to invoke a device driver to print the print job, the printing commands being issued by the program to print a print job immediately on the identified printer;

under the control of the operating system:
receiving the issued printing commands;
determining that the identified printer is presently unavailable;
in response to determining that the identified printer is presently unavailable:
persistently storing information from the printing commands, such that the stored information may be used to invoke the device driver to print the print job on the identified printer at a later time; and
though the print job was not actually printed, returning to the program an indication that the issued printing commands were successfully completed and the print job was printed.

9. The computer-readable medium of claim 8 wherein the contents of the computer-readable medium further cause the computer system to perform the steps of:

at a time after the performance of the returning step, determining that the identified printer is available;
in response to the step of determining that the identified printer is available, retrieving the information stored persistently; and
using the retrieved information to print the print job on the identified printer.

10. The computer readable medium of claim 8 wherein the printing interface of the operating system is a graphic device interface.

11. A generated data signal conveying to a printing application a false print job completion data structure, the data structure comprising:

an indication that an identified print job has completed, the data signal being generated and transmitted to the printing application upon determining that a printer specified by the identified print job is unavailable to print the identified print job in response to printing commands issued by the printing application to print the identified print job immediately on the printer by calling a printing interface of the operating system to invoke a device driver to print the print job, the data signal being generated and transmitted to the printing application despite the fact that the print job has not been printed and cannot be printed under present conditions.

* * * * *